May 19, 1931.  W. A. FLUMERFELT  1,806,286
JOINT
Filed April 26, 1930
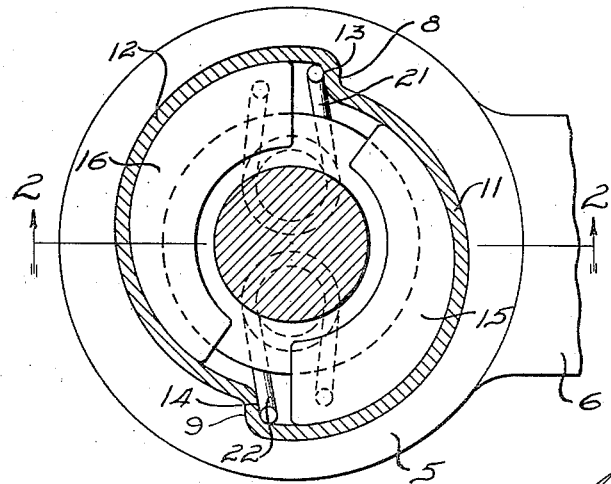
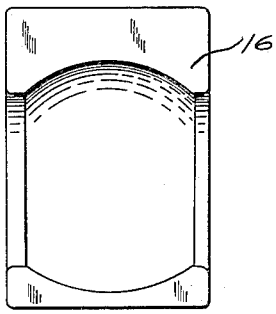
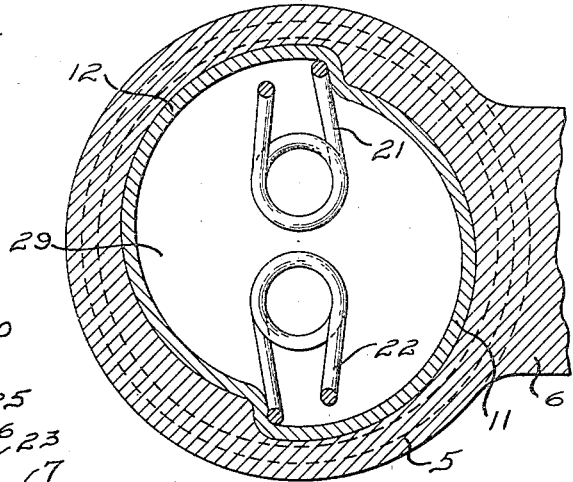
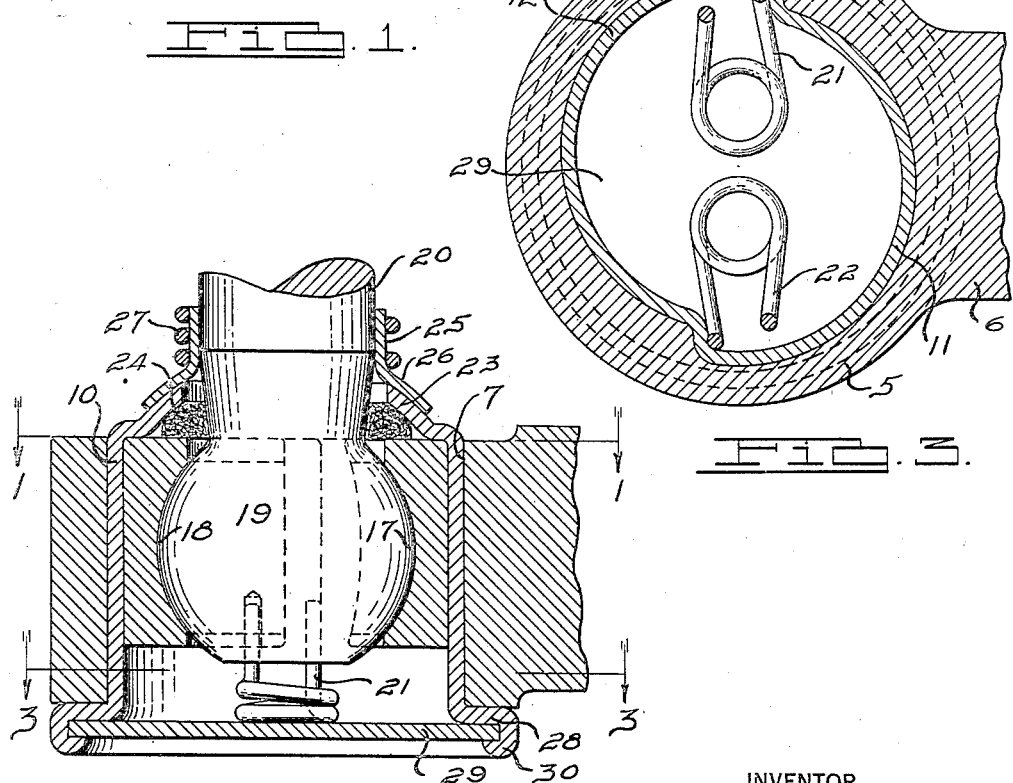
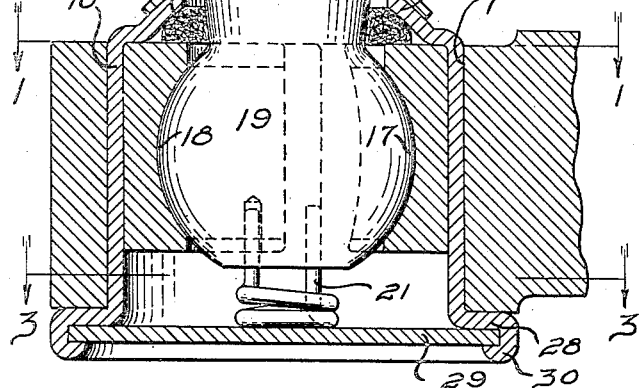
INVENTOR
William A. Flumerfelt.
BY
Harness, Dickey, Pierce & Hann,
ATTORNEYS.

Patented May 19, 1931

1,806,286

UNITED STATES PATENT OFFICE

WILLIAM A. FLUMERFELT, OF COLUMBUS, OHIO, ASSIGNOR TO THE COLUMBUS AUTO PARTS COMPANY, A CORPORATION OF OHIO

JOINT

Application filed April 26, 1930. Serial No. 447,512.

This invention relates to a joint construction particularly of the ball and socket type.

The main objects of this invention are to provide an improved type of joint or bearing construction which is automatically adjustable to compensate for wear; to provide a construction in which the axial center of the ball member will not shift relatively to the surrounding housing when adjusted by reason of wear in the parts; and to provide an automatically adjustable construction of this character which will be simple in design, economical to manufacture and which will give long and satisfactory service.

An illustrative embodiment of this invention is shown in the accompanying drawings, in which Fig. 1 is a sectional view of my improved construction taken on the line 1—1 of Fig. 2 looking in the direction indicated by the arrows.

Fig. 2 is a sectional view of the same taken on the line 2—2 of Fig. 1, looking in the direction indicated by the arrows.

Fig. 3 is another sectional view of the same taken on the line 3—3 of Fig. 2 looking in the direction indicated by the arrows.

Fig. 4 is a view in face elevation of one of the eccentric socket wedge members.

In the construction shown in the drawings, an outer housing in the form of a cylindrical head 5 having a shank 6 integrally formed therewith is provided with an axially extending opening 7 therethrough. The opening 7 is shaped to form two semi-cylindrical portions offset from each other in an axial plane so as to provide axially extending shoulders 8 and 9 at diametrically opposite sides thereof.

A thin sheet metal casing 10 of relatively hard material is fitted within the opening 7 and is of the same outside shape and contour as the opening so as to also provide a pair of semi-cylindrical portions 11 and 12 which are offset in an axial plane with respect to each other and to provide axially extending shoulders 13 and 14 at diametrically opposite sides.

A pair of curved wedge-shaped members 15 and 16 are circumferentially slidable in the semi-cylindrical portions 11 and 12, respectively. The members 15 and 16 have ball sockets 17 and 18 eccentrically formed in their respective inner faces for embracing an inner ball member 19 which has a shank 20 integrally formed thereon for securing it to another member.

Automatic means are provided for circumferentially sliding the socket members 15 and 16 around their respective shell portions and comprise torsion springs 21 and 22 mounted within the shell 10 below the ball 19. One end of the spring 21 is bent upwardly and abuts against the shoulder 13 and the other end thereof is similarly bent and extends up into a socket formed in the lower side of the member 16, engaging said member and constantly urging it to circumferentially rotate in a left hand direction as viewed in Fig. 1 of the drawings.

One end of the spring 22 is bent upwardly and engages against the shoulder 14 and the other end thereof is similarly bent upwardly and engages in a socket formed in the underside of the wedge 15 to normally urge said wedge to rotate circumferentially, also in a left hand direction as viewed in Fig. 1 of the drawings.

The upper end of the shell 10, as shown in Fig. 2 of the drawings, is drawn upwardly to form an annular flange 23 beneath which is provided a gasket 24 of suitable material for retaining lubricant in the joint. A dust cover plate 25, having an outwardly flaring lower end 26, is axially slidable on the shank 20 and yieldingly urged downwardly onto the upper surface of the flange 23 by a helical compression spring 27. The lower end of the spring 27 bears against the outwardly flaring portion 26 of the cover and the upper end of the spring bears against the member mounted on the shank 20 (not shown).

The lower end of the shell 10 is turned outwardly to form a radially extending seat 28 for receiving a bottom cover plate 29. The marginal edge of the shell forming the seat 28 is crimped or spun around and inwardly so as to embrace the marginal edge of the closure plate 29, as shown at 30, for sealing the plate into the shell so as to support the torsion springs 21 and 22 and hold them in proper position therein.

In the operation of this device, the assembly is made as shown in the drawings with the springs 21 and 22 under tension so as to constantly urge the wedge members 15 and 16 circumferentially around their respective shell portions and thus snugly embrace the ball 19. If wear occurs between the ball and the socket faces of the wedge members 15 and 16, the springs 21 and 22 will move the socket members in a left hand direction as viewed in Fig. 1 of the drawings, thus closing them or tightening them about the ball 19 to compensate for such wear.

Although but one specific embodiment of this invention has been herein shown and described, it will be understood that numerous details of the construction shown may be altered or omitted without departing from the spirit of this invention as defined by the following claims.

I claim:

1. In a ball and socket joint construction, an inner ball member, an outer member comprising two semi-cylindrical portions offset with respect to each other in an axial plane, eccentric wedge members circumferentially slidable in said semi-cylindrical portions, said wedge members having ball sockets in their inner faces for embracing opposite sides of said ball member and means for sliding said wedge members to snugly embrace said inner member.

2. A ball and socket joint construction comprising a ball member, a housing member surrounding said ball in spaced relation thereto and said housing having two semi-cylindrical portions offset with respect to each other in an axial plane, wedge members circumferentially slidable in said semi-cylindrical portions, said wedge members having eccentrically positioned ball seat sockets in their inner faces for embracing said ball member and means for circumferentially sliding said wedge members to snugly embrace said ball member.

3. A ball and socket joint construction comprising a ball member, a housing member surrounding said ball in spaced relation thereto and said housing having two semi-cylindrical portions offset with respect to each other in an axial plane forming shoulders at diametrically opposite sides of said housing, wedge members circumferentially slidable in said semi-cylindrical portions, said wedge members having eccentrically positioned ball seat sockets in their inner faces for embracing said ball member and spring means bearing between said shoulders and said wedge members for sliding the wedge members to snugly embrace the ball member.

4. A ball and socket joint construction comprising a housing member having an opening therethrough, a shell of relatively hard material positioned in said opening, said shell having two semi-cylindrical portions offset with respect to each other in an axial plane, wedge members circumferentially slidable in said portions, said wedge members having eccentrically positioned ball seat sockets in their inner faces, a ball member embraced by said wedge socket members, and means for circumferentially sliding the wedge socket members to snugly embrace the ball members.

5. A ball and socket joint construction comprising a housing member having an opening therethrough, a shell of relatively hard material positioned in said opening, said shell having two semi-cylindrical portions offset with respect to each other in an axial plane forming shoulders at diametrically opposite sides of said housing, wedge members circumferentially slidable in said portions, said wedge members having eccentrically positioned ball seat sockets in their inner faces, a ball member embraced by said wedge members, and torsion springs bearing between said shoulders and said wedge socket members for sliding the wedge members to snugly embrace the ball member.

WILLIAM A. FLUMERFELT.